US009531619B2

(12) United States Patent
Kliger et al.

(10) Patent No.: US 9,531,619 B2
(45) Date of Patent: Dec. 27, 2016

(54) CHANNEL ASSESSMENT IN AN INFORMATION NETWORK

(71) Applicant: BROADCOM CORPORATION, Irvine, CA (US)

(72) Inventors: Avi Kliger, Ramat Gan (IL); Philippe Klein, Jerusalem (IL); Yitshak Ohana, Givat Zeev (IL)

(73) Assignee: BROADCOM CORPORATION, Irvine, CA (US)

(*) Notice: Subject to any disclaimer, the term of this patent is extended or adjusted under 35 U.S.C. 154(b) by 377 days.

(21) Appl. No.: 14/102,390

(22) Filed: Dec. 10, 2013

(65) Prior Publication Data
US 2014/0146698 A1 May 29, 2014

Related U.S. Application Data

(63) Continuation of application No. 12/748,625, filed on Mar. 29, 2010, now abandoned.
(Continued)

(51) Int. Cl.
*H04L 12/26* (2006.01)
*H04L 12/28* (2006.01)

(52) U.S. Cl.
CPC .......... *H04L 43/12* (2013.01); *H04L 12/2697* (2013.01); *H04L 12/2801* (2013.01); *H04L 12/2838* (2013.01); *H04L 43/50* (2013.01)

(58) Field of Classification Search
None
See application file for complete search history.

(56) References Cited

U.S. PATENT DOCUMENTS

| 3,836,888 A | 9/1974 | Boenke et al. |
| 4,413,229 A | 11/1983 | Grant |

(Continued)

FOREIGN PATENT DOCUMENTS

| CN | 1422043 A | 6/2003 |
| CN | 1588827 A | 3/2005 |

(Continued)

OTHER PUBLICATIONS

Niemietz, "Mask (computing)", Mar. 17, 2008, Wikipedia, all pages.*

*Primary Examiner* — Kwang B Yao
*Assistant Examiner* — Adam Duda
(74) *Attorney, Agent, or Firm* — McDermott Will & Emery LLP

(57) ABSTRACT

A method for assessing channel performance in a network is provided. The network includes a network controller and nodes. The method preferably includes selecting a channel for assessment and allocating a first probe operation for use with the nodes. The method may also include, in response to the allocating, sending a first probe operation report message from each of the nodes to the network controller. The method may further include using the network controller to select a node to be a channel assessment operation node. In addition, the method may include selecting at least a portion of the nodes to participate in a channel assessment operation signal exchange. The method may also include moving the selected nodes to a different channel to perform a channel assessment operation on the different channel and using the channel assessment operation node to allocate a second probe operation on each of the selected nodes.

20 Claims, 2 Drawing Sheets

Related U.S. Application Data

(60) Provisional application No. 61/167,255, filed on Apr. 7, 2009.

(56) References Cited

U.S. PATENT DOCUMENTS

| | | | |
|---|---|---|---|
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford, Jr. et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,234,413 B1 | 5/2001 | Greaney |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,586 B1 | 4/2003 | Lin |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore, Jr. et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,783,259 B2 | 8/2010 | Dessert et al. |
| 7,860,092 B2 | 12/2010 | Yoon et al. |
| 7,916,756 B2 | 3/2011 | Atsumi et al. |
| 8,184,550 B2 | 5/2012 | Beck et al. |
| 2001/0001833 A1 | 5/2001 | Ravenscroft et al. |
| 2001/0039660 A1 | 11/2001 | Vasilevsky et al. |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger et al. |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne |
| 2006/0078001 A1 | 4/2006 | Chandra et al. |

(56) References Cited

U.S. PATENT DOCUMENTS

| | | |
|---|---|---|
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0117919 A1 | 5/2008 | Kliger et al. |
| 2008/0117929 A1 | 5/2008 | Kliger et al. |
| 2008/0130779 A1 | 6/2008 | Levi et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0219371 A1* | 9/2008 | Hong .................. H04L 25/022 375/260 |
| 2008/0225832 A1 | 9/2008 | Kaplan et al. |
| 2008/0238016 A1 | 10/2008 | Chen et al. |
| 2008/0259957 A1 | 10/2008 | Kliger et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0010263 A1 | 1/2009 | Ma et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0094995 A1* | 4/2010 | Barr ................... H04L 43/12 709/224 |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0238932 A1 | 9/2010 | Kliger et al. |
| 2010/0246586 A1 | 9/2010 | Ohana et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0206042 A1 | 8/2011 | Tarrab et al. |
| 2011/0310907 A1 | 12/2011 | Klein et al. |
| 2012/0093244 A1 | 4/2012 | Levi et al. |

FOREIGN PATENT DOCUMENTS

| | | |
|---|---|---|
| EP | 0385695 A2 | 9/1990 |
| EP | 0622926 A2 | 11/1994 |
| EP | 1501326 | 1/2005 |
| JP | 60160231 A | 8/1985 |
| WO | WO-9827748 A2 | 6/1998 |
| WO | WO-9831133 A2 | 7/1998 |
| WO | WO-9935753 A2 | 7/1999 |
| WO | WO-9946734 | 9/1999 |
| WO | WO-0031725 | 6/2000 |
| WO | WO-0055843 | 9/2000 |
| WO | WO-0180030 | 10/2001 |
| WO | WO-0219623 A2 | 3/2002 |

\* cited by examiner

CHANNEL ASSESSMENT IN AN INFORMATION NETWORK

CROSS-REFERENCE TO RELATED APPLICATIONS

This application is a continuation of U.S. patent application Ser. No. 12/748,625, filed Mar. 29, 2010, entitled "Channel Assessment in an Information Network," which claims priority to U.S. Provisional Application No. 61/167,255, filed on Apr. 7, 2009, entitled "Channel Assessment in an Information Network," both of which are hereby incorporated by reference in their entirety.

FIELD OF TECHNOLOGY

The present invention relates generally to information networks and specifically to transmitting information such as media information over communication lines such as coaxial cable (hereinafter "coax"), thereby to form a communications network.

BACKGROUND

Home networking over coax is a known technology which has vast commercial potential.

Home network technologies having packet aggregation functionality are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. Packet aggregation functionality is not provided.

Home networking over coax taps into the vast amounts of unused bandwidth available on the in-home coax. More than 70% of homes in the United States have coax already installed into the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home without affecting the existing analog or digital services present on the cable. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHZ for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

The coax infrastructure inside the house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single "isolation jump" and a number of "insertion jumps". Typically isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network unlike some other home networking technologies. It is specifically designed to support streaming video without packet loss providing very high video quality between outlets.

Digital cable programming is delivered with threshold Packet Error Rate (PER) of below 1e-6. The home network should preferably have similar or better performance so as not to degrade viewing.

Later versions of the MoCA specification may require or permit that a MoCA device transmit and receive on more than one channel. For the purposes of this application the term "channel" should be understood to refer to an operational frequency upon which a MoCA network can operate.

SUMMARY OF THE INVENTION

A system and/or method channel assessment in a communications network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
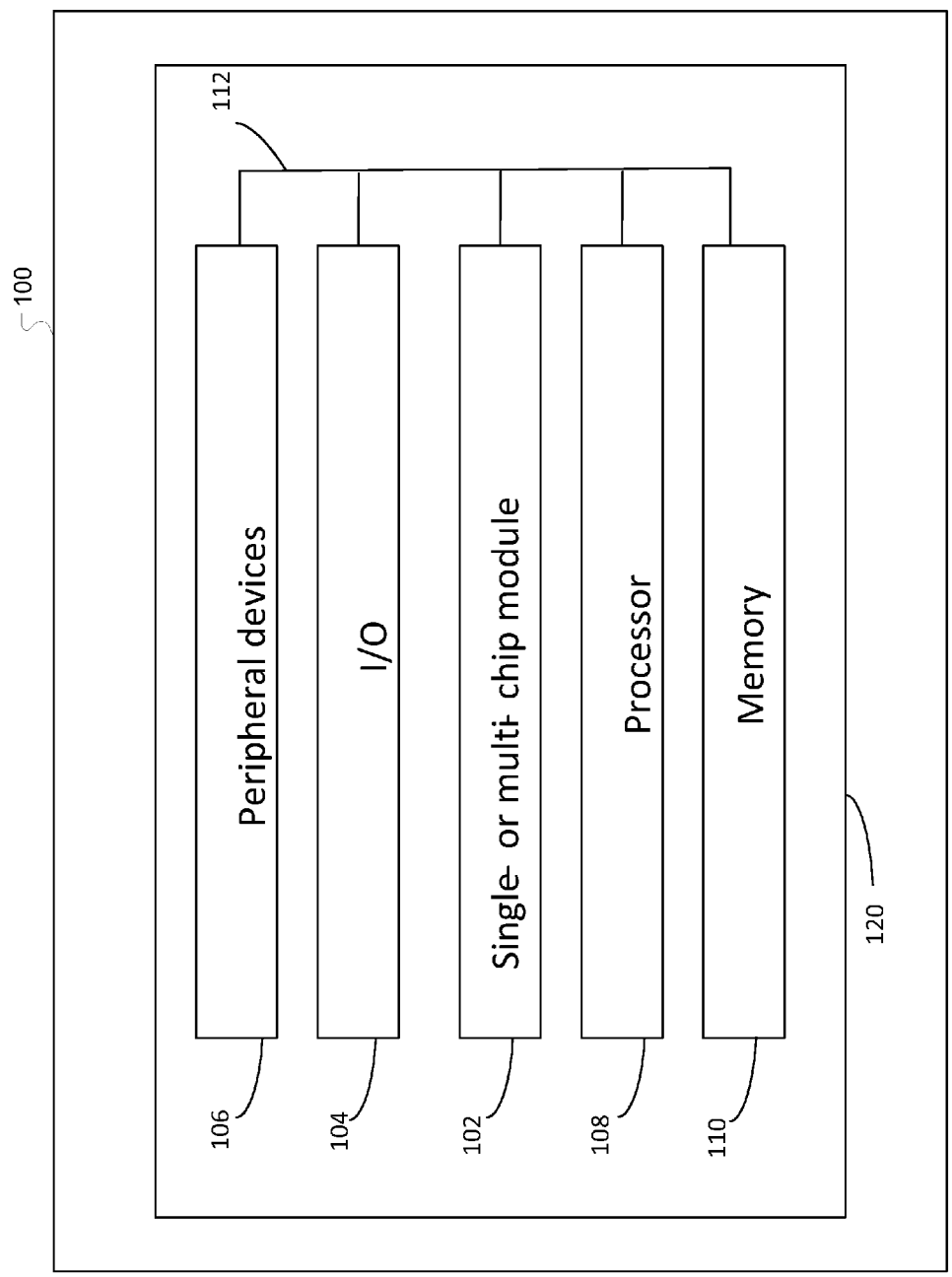
FIG. 1 shows a schematic diagram of an illustrative single or multi-chip device that may be used in accordance with principles of the invention.

Apparatus and methods for channel assessment in a communication network are provided. In some embodiments, the apparatus and methods may move a node from a first channel to a second channel to assess performance of the node on the second channel. The performance may be dependent on noisiness of the node on the second channel.

Some embodiments may involve "Another Channel Assessment," which is a procedure that allows nodes to move to another channel for interference detection or expected performance assessments.

A channel assessment operation ("CAO") may be triggered by an application that is external to a network controller ("NC"). The CAO may be managed and scheduled by the NC. The NC may gather channel assessment results. In certain embodiments, the CAO may be identified in a Media Access Plan ("MAP") as a link state.

The channel assessment results may include information regarding noise conditions on each node input and full mesh rate for each node on each channel. The channel assessment results may also provide an estimation of the achievable capacity in the assessed channel.

The channel assessment results may be accessible by a higher layer application. The results may include for each node and channel information regarding noise measured or estimated for each channel at each of the nodes. The information may include MoCA Probe0 information. MoCA Probe-0 information corresponds to a period of time on the network when none of the nodes transmit information. It is a silent probe and, to reiterate, all nodes in the network preferably do not transmit during this silent probe. Rather, it is a period of time in which each node measures the existing noise on the network from the respective node's perspective.

The higher layer application may decide whether to initiate a transfer from one channel to another channel. The higher layer application may assess the whole band—i.e., each operational frequency available to the network—to determine an optimal channel for the implementation of the higher layer application's network. Once channel assessment results are available for the application, it may decide to move the network to another channel. Illustrative reasons to move the network to another channel include:

1. The performance on the current channel is not sufficient to provide the required throughput due to either large attenuations or some RF ingress interference.

2. Moving the network to another channel is required to improve the performance further or reduce aggregated transmission power by moving to a channel that has better noise and attenuation conditions.

3. A new node that joined the network reduces significantly the network aggregated throughput, or is creating some unusable channels.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows a single or multi-chip module 102 according to the invention, which can be one or more integrated circuits, in an illustrative data processing system 100 according to the invention. Data processing system 100 may include one or more of the following components: I/O circuitry 104, peripheral devices 106, processor 108 and memory 110. These components may be coupled together by a system bus or other interconnections 112 and are disposed on a circuit board 120 in an end-user system 130 that may be in communication with a coax medium via an interface.

For the sake of clarity, the foregoing description, including specific examples of parameter values provided, is sometimes specific to certain protocols such as those identified with the name MoCA™ and/or Ethernet protocols. However, this is not intended to be limiting and the invention may be suitably generalized to other protocols and/or other packet protocols. The use of terms that may be specific to a particular protocol such as that identified by the name MoCA™ or Ethernet to describe a particular feature or embodiment is not intended to limit the scope of that feature or embodiment to that protocol specifically; instead the terms are used generally and are each intended to include parallel and similar terms defined under other protocols.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may be provided in combination in a single embodiment. Conversely, features of the invention which are described for brevity in the context of a single embodiment may be provided separately or in any suitable subcombination.

As will be appreciated by one of skill in the art, the invention described herein may be embodied in whole or in part as a method, a data processing system, chip, component or device, or a computer program product. Accordingly, the invention may take the form of an entirely hardware embodiment, an entirely software embodiment or an embodiment combining software, hardware and any other suitable approach or apparatus.

The invention may be operational with numerous other general purpose or special purpose computing system environments or configurations. Examples of well known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 2:
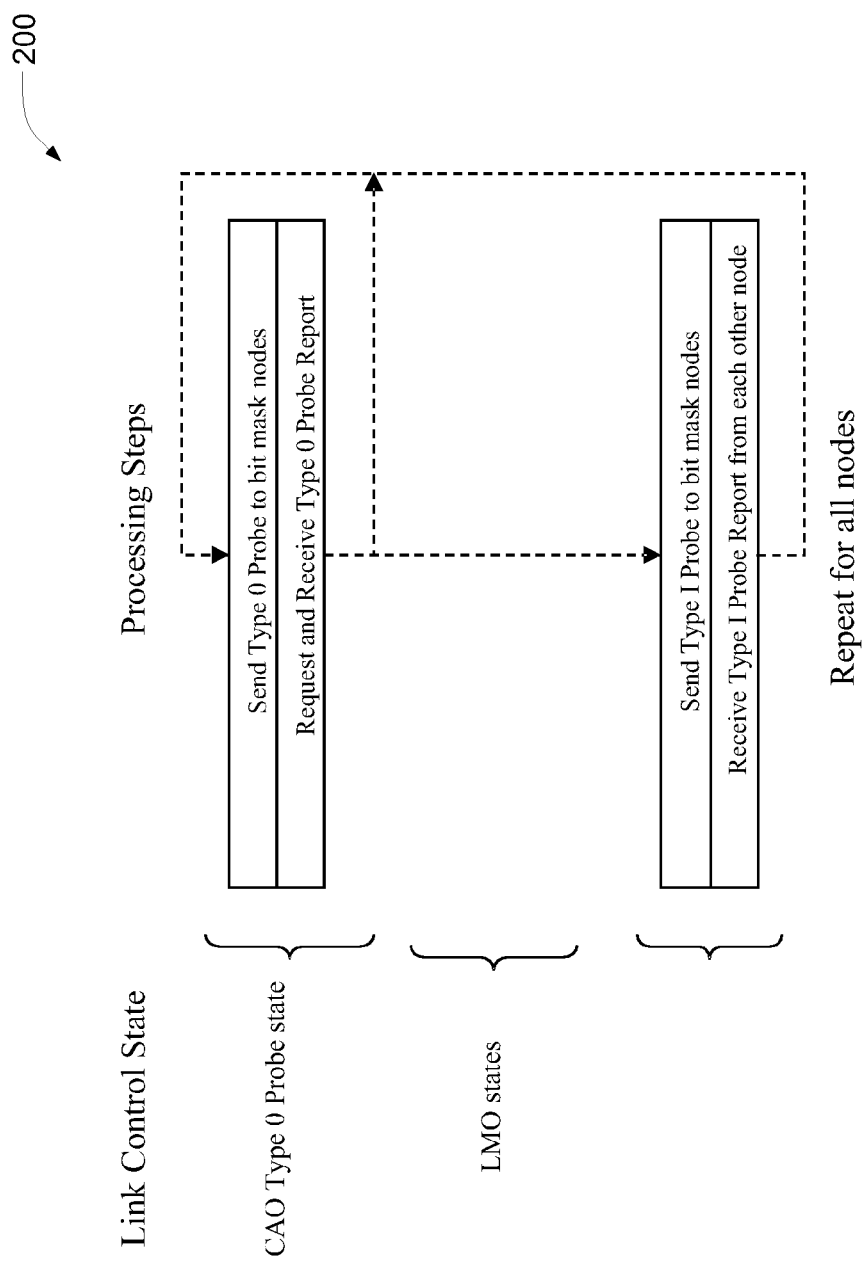
FIG. 2 shows illustrative steps of a process in accordance with the principles of the invention.

Processes in accordance with the principles of the invention may include one or more features of the process illustrated in FIG. 2. For the sake of illustration, the steps of the process illustrated in FIG. 2 will be described as being performed by a "system". The "system" may include one or more of the features of the apparatus that are shown in FIG. 1 and/or any other suitable device or approach. The "system" may be provided by an entity. The entity may be an individual, an organization or any other suitable entity.

FIG. 2 shows illustrative channel assessment process 200. Process 200 may send Type 0 Probe to bit mask nodes, Request and Receive Type 0 Probe Report, Send Type I Probe to bit mask nodes, and Receive Type I Probe Report from each other node. The process may be repeated for some or all of the other nodes.

Type 0 probe is a time period in which all nodes of a network, and in some embodiments a subset of the network, are quiet. Type 0 probe may be used for detecting the existence of interference or another network (Beacon detecting) by the assessing node.

In some embodiments, a channel assessment operation may proceed as follows:

(1) NC selects a channel for assessment;
(2) NC allocates a "Probe-0" operation for all nodes or a list of nodes;
(3) All nodes that participated in (2) send Probe 0 report message to the NC;
(4) NC may select a node to be a "CAO node" (based on the reported Probe-0 results) and a list of nodes that may or must participate in the CAO signal exchange, or go back to (1);
(5) Selected nodes move to the selected channel to perform CAO Probe 1 where the CAO transmits Probe 1 message to all other nodes;
(6) NC selects the next node to be the CAO node and the process in (4) and (5) is repeated;
(7) All nodes that participated in the CAO process send their calculated full mesh rate ("FMR") on the assessed channel to the NC, using CAO probe 1 report; and
(8) NC may select another channel for assessment and go back to (1).

In some embodiments, the following factors may be considered in connection with a transition from one channel to another channel:

1. NC MUST allocate a Transition Time for a node to move to another channel (Tlo ~100 uSec).
2. During this time transmission on the current channel can continue.
3. After Tlo and until the allocated time for the Probe0 operation and Type I Probe operation NC should preferably not allocate any transmission opportunity on the current channel.
4. One CAO step should preferably follow a full link maintenance operation ("LMO") procedure.

In some embodiments, messages may be used in connection with channel assessment. Illustrative messages include:

1. "Probe_0_for_channel_Assessment_Report"

NC may use this command to schedule a node to send a Probe 0 report on the assessed channel.

2. "FMR_for_channel_Assessment_Report"

NC may use this command to schedule a node to send a Full Mesh Rates per the assessed channel.

Table 1 shows illustrative link state fields and other associated fields within a MAP frame to indicate a CAO State.

TABLE 1

| | | |
|---|---|---|
| Link_State | 32 bits | Informs nodes of the state of the network.<br>Least significant nibble indicates Link Control state -<br>0x0 = Deprecated - treat as 0x6<br>0x1 = Begin Node Admission state<br>0x2 = New Node Type I Probe TX state<br>0x3 = New Node Type I Probe RX state<br>0x4 = New GCD Distribution state<br>0x5 = Begin PHY Profile state<br>0x6 = Steady state<br>0x7 = Type III Probe state<br>0x8 = LMO Type I Probe state<br>0x9 = LMO Node GCD Distribution state<br>0xA = Begin LMO PHY Profile state<br>0xB - GCD LMO state<br>0xC - CAO Type 0 Probe state<br>0xD - CAO Type I Probe state<br>All other values reserved. |
| LMO/CAO_NODE | 16 bits | if LINK_STATE = 0x7-0xB<br>Node ID of link node that is the current LMO node.<br>if LINK_STATE = 0xC-0xD<br>Node ID of link node that is the current CAO node.<br>Note that this field should contain valid node ID only in Link Control states 0x7-0xD and should be ignored in all other Link Control states. |
| LMO_DESTINATION/<br>CAO_DESTINATIONBIT<br>MASK | 16 bits | if LINK_STATE = 0x7-0xB<br>Node ID for destination node<br>Always set to BROADCAST (0x3F)<br>if LINK_STATE = 0xC-0xD<br>Node ID bit mask for the CAO destination nodes |

In some embodiments, a process to move to another channel may be initiated by the NC. The NC may remain NC on the other channel. Each node may set its LoF to the selected channel's frequency. Each node may use a random backoff to start admission to the new channel. A move to another channel may interrupt network operation and should not be done frequently.

Table 2 shows an illustrative Type 0 Probe report request format.

TABLE 2

| Field | Length | Usage |
|---|---|---|
| MAC Header | | |
| Transmit_Clock | 32 bits | |
| Packet_Subtype | 4 bits | Type: 0/I/III Probe Report Request (0x5) |
| Packet_Type | 4 bits | Link Control (0x2) |
| Version | 8 bits | |
| reserved | 8 bits | 0x00; Type I |
| Source_Node_ID | 8 bits | Source node ID |
| reserved | 8 bits | 0x00; Type I |
| Destination_Node_ID | 8 bits | Destination node ID |
| Packet_Length | 16 bits | |
| reserved | 32 bits | Type III |
| Header_Checksum | 16 bits | Only following values allowed - 0x1 - Type I Probe  0x2 - Type II Probe  0x4 - Type III Probe.  0x5 - GCD Type I Probe  0x6 - Type 0 Probe |
| Frame payload | | |
| Report Source Node | 8 bits | Node ID of the CAO node |
| Report Destination Node | 8 bits | Node ID of the NC node |
| Reserved | 16 bits | Type II |
| RESERVED | 32 bits | Type II |
| Payload CRC | | |
| PAYLOAD_CRC | 32 bits | |

Table 3 shows an illustrative Type 0 Probe Report Frame Format.

TABLE 3

| Field | Length | Usage |
|---|---|---|
| MAC Header | | |
| TRANSMIT_CLOCK | 32 bits | |
| PACKET_SUBTYPE | 4 bits | Type 0 Probe Report (0xF) |
| PACKET_TYPE | 4 bits | Link Control (0x2) |
| VERSION | 8 bits | |
| RESERVED | 8 bits | 0x00; Type I |
| SOURCE_NODE_ID | 8 bits | Source node ID |
| RESERVED | 8 bits | 0x00; Type I |
| DESTINATION_NODE_ID | 8 bits | Destination node ID |
| PACKET_LENGTH | 16 bits | |
| RESERVED | 32 bits | Type III |
| HEADER_CHECKSUM | 16 bits | |
| Frame payload | | |
| NUM_ELEMENTS | 8 bits | the total number of element each element indicates the average noise of 8 successive sub carrier |
| For j = 0; j < 512; j++ { | | |
| NOISE (RECEIVED LEVEL) | 8 bits | This field is quantitative indication on the received level of the noise for a subcarrier |
| } | | |
| NETWORK_DETECT | 8 bits | Network detect on the assessment channel  00 - not detect  10 - MoCA 1.0 network detect  11 - MoCA 1.1 network detect  20 - MoCA 2.0 network detect |
| RESERVED | | |
| Payload CRC | | |

Table 4 shows an illustrative New Probe subtype for Type 0 Probe.

TABLE 4

| FIELD | LENGTH | USAGE |
|---|---|---|
| PROBE_SUBTYPE | 4 BITS | ONLY FOLLOWING VALUES ALLOWED -  0X1 - TYPE I PROBE  0X2 - TYPE II PROBE  0X4 - TYPE III PROBE.  0X5 - GCD TYPE I PROBE  0X6 - TYPE 0 PROBE |

All bits in the RESERVED fields in the syntax should preferably be set to 0.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for channel assessment have been provided. Persons skilled in the art will appreciate that the present invention can be practiced by other than the described embodiments, which are presented for purposes of illustration rather than of limitation.

What is claimed is:

1. A method for coordinating alternate channel assessment on a network comprising a plurality of nodes, the method comprising:
   identifying an alternate channel for assessment, an assessment transmission node of the plurality of nodes to participate in the assessment by transmitting a probe message on the alternate channel, and at least one assessment node of the plurality of nodes to participate in the assessment by receiving the probe message on the alternate channel, wherein the assessment transmission node is distinct from the at least one assessment node;
   scheduling, over a current channel, the assessment of the alternate channel exclusively by the assessment transmission node and the at least one assessment node;
   transmitting, to the at least one assessment node over the current channel and subsequent to the scheduling, a probe report request in relation to the assessment of the alternate channel, wherein the probe report request comprises a first field that identifies the assessment transmission node; and
   receiving, from the at least one assessment node over the current channel, at least one probe report that comprises at least one result of the assessment of the alternate channel.

2. The method of claim 1, wherein the scheduling, over the current channel, the assessment of the alternate channel by the assessment transmission node and the at least one assessment node further comprises:
   transmitting, to the plurality of nodes over the current channel, a message that comprises second fields that are indicative of the alternate channel, the assessment transmission node, and the at least one assessment node.

3. The method of claim 2, wherein the identifying, the transmitting the message, the transmitting the probe report request and the receiving, are performed by a network coordinator that is distinct from the assessment transmission node and the at least one assessment node.

4. The method of claim 3, further comprising:
receiving, by the network coordinator, a request to initiate the assessment of the alternate channel.

5. The method of claim 4, wherein the request to initiate the assessment of the alternate channel is triggered by an application external to the network coordinator and the plurality of nodes, and the method further comprises:
providing, by the network coordinator, the at least one probe report that comprises the at least one result of the assessment of the alternate channel.

6. The method of claim 2, wherein the at least one assessment node is identified in the message by a bit mask.

7. The method of claim 1, wherein the at least one result of the at least one probe report comprises performance information corresponding to a plurality of subcarriers of the alternate channel.

8. The method of claim 1, wherein the current channel is distinct from the alternate channel.

9. The method of claim 1, wherein a communication medium of the network comprises a coaxial cable.

10. A node communicating over a network comprising a plurality of nodes, the node comprising:
a processor; and
a memory including instructions that, when executed by the processor, causes the processor to:
identify an alternate channel for assessment, an assessment transmission node of the plurality of nodes to participate in the assessment by transmitting a probe message on the alternate channel, and at least one assessment node of the plurality of nodes to participate in the assessment by receiving the probe message on the alternate channel, wherein the assessment transmission node is distinct from the at least one assessment node;
transmit, to the plurality of nodes over a current channel, a message that comprises first fields that are indicative of the alternate channel, the assessment transmission node, and the at least one assessment node;
transmit, to the at least one assessment node over the current channel and subsequent to transmitting the message, a probe report request in relation to the assessment of the alternate channel, wherein the probe report request comprises a second field that identifies the assessment transmission node; and
receive, from the at least one assessment node over the current channel, at least one probe report that comprises at least one result of the assessment of the alternate channel.

11. The node of claim 10, wherein a communication medium of the network comprises a coaxial cable.

12. The node of claim 10, wherein the node comprises a network coordinator that is distinct from the assessment transmission node and the at least one assessment node.

13. The node of claim 10, wherein the at least one assessment node is identified in the message by a bit mask.

14. The node of claim 10, wherein the current channel comprises a different frequency than the alternate channel.

15. The node of claim 10, wherein the at least one result of the at least one probe report comprises performance information corresponding to a plurality of subcarriers of the alternate channel.

16. A computer program product comprising instructions stored in a non-transitory computer-readable storage medium, the instructions comprising:
instructions to determine an alternate channel for assessment, an assessment transmission node of a plurality of nodes of a network to participate in the assessment by transmitting a probe message on the alternate channel, and at least one assessment node of the plurality of nodes to participate in the assessment by receiving the probe message on the alternate channel, wherein the assessment transmission node is distinct from the at least one assessment node;
instructions to transmit, to the plurality of nodes over a current channel and prior to the assessment of the alternate channel, a message that comprises first fields that identify the determined alternate channel, the determined assessment transmission node, and the determined at least one assessment node;
instructions to transmit, to the at least one assessment node over the current channel and subsequent to transmitting the message, a probe report request in relation to the assessment of the alternate channel, wherein the probe report request comprises a second field that identifies the assessment transmission node; and
instructions to receive, from the at least one assessment node over the current channel, a probe report that comprises at least one result of the assessment of the alternate channel.

17. The computer program product of claim 16, wherein the at least one assessment node is identified in the message by a bit mask.

18. The computer program product of claim 16, wherein the current channel is distinct from the alternate channel.

19. The computer program product of claim 16, wherein the at least one result of the at least one probe report comprises performance information corresponding to a plurality of subcarriers of the alternate channel.

20. The computer program product of claim 16, the instructions further comprising:
instructions for receiving a request to initiate the assessment of the alternate channel; and
instructions for providing the at least one probe report that comprises the at least one result of the assessment of the alternate channel.

* * * * *